UNITED STATES PATENT OFFICE.

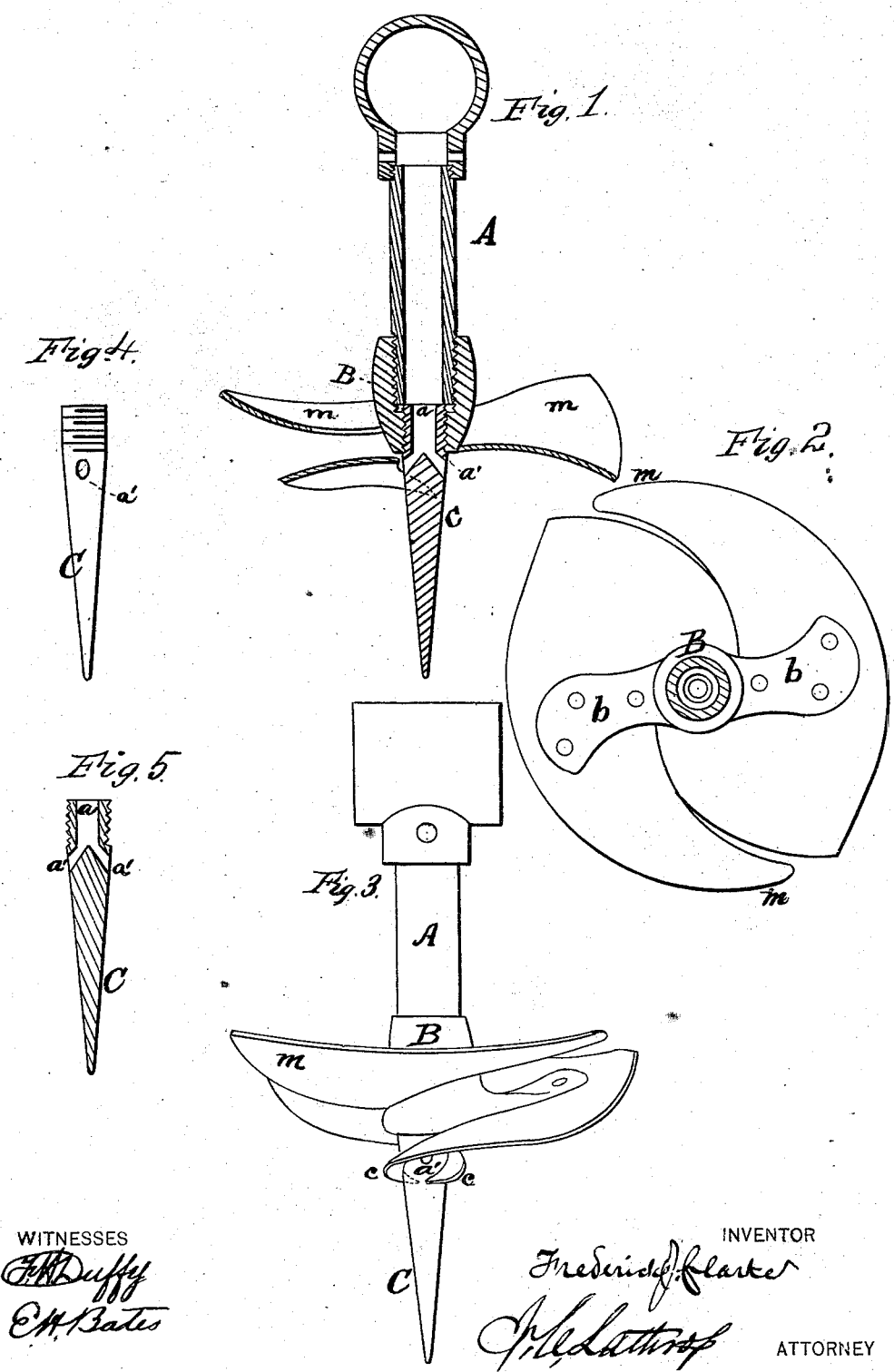

FREDERICK J. CLARKE, OF MOUNT PLEASANT, IOWA.

IMPROVEMENT IN EARTH-AUGERS.

Specification forming part of Letters Patent No. 160,648, dated March 9, 1875; application filed February 20, 1875.

*To all whom it may concern:*

Be it known that I, FREDERICK J. CLARKE, of Mount Pleasant, in the county of Henry and State of Iowa, have invented certain new and useful Improvements in Earth-Augers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 represents a vertical section of my improved auger. Fig. 2 is a top or plan view. Fig. 3 is a side elevation. Figs. 4 and 5 are details of the auger-point detached.

My invention relates to an improvement on Allen S. Ballard's post-auger, patented September 25, 1860, being No. 30,175, reissued December 22, 1874, to adapt the same to the use of a shaft or stem made of a hollow tube or gas-pipe; and consists, principally, in making the point detachable, and connecting it to a shank on the cross-bar by means of a screw-thread, while the hollow shaft is connected, by a similar screw-thread, to the same shank, and made to lock the detachable point, with its openings, in proper relation to the blades, said opening being protected by flanges of the blades, as will be more fully described hereafter.

C is the auger-point, made about six inches in length, and has a hole, $a$, in the upper end about half an inch in diameter, opening out obliquely on each side $a$. This point C is attached to the cross-bar $b$ by a screw cut on its upper end, and, when screwed into the socket or shank B of the cross-bar $b$ a proper distance, so that the openings $a'$ in its sides are directly under the blades $m$ of the auger, and back of the points or flanges $c\,c$, the gas-pipe shaft A is screwed down firmly upon it, and locks it in position. The openings $a'$ in its sides are then protected by the points or flanges $c\,c$ from filling up with dirt while boring, and in drawing the auger from the post-hole, with its accumulation of dirt, the vacuum below will be filled by the air rushing down the hollow shaft A and through the openings $a$ in the sides of the point C.

When this point C gets broken or worn, and unfit for use, it may be readily taken out and replaced by a new one without sacrificing the cross-bar $b$, as is done in other cases where the point is made in one piece with said cross-bar.

I am aware that gas-pipe and hollow pipe have been used for the shafts of earth-augers. I therefore do not lay claim to this; but What I do claim as new, and desire to secure by Letters Patent, is—

1. The detachable point C, screwing into the shank or hub B, and the hollow shaft A, screwing into the same shank, so as to lock each other, in combination with said shank and cross-bar $b$, substantially as and for the purposes set forth.

2. The combination and arrangement of the hollow shaft A, detachable point C, provided with openings $a'\,a'$, which are protected by flanges $c\,c$, and the cross-bar $b$ of the auger-blades, substantially as shown and described.

In testimony that I claim the foregoing as my own I herewith affix my signature in presence of two witnesses.

F. J. CLARKE.

Witnesses:
 E. M. BATES,
 F. H. DUFFY.